June 12, 1951 — E. B. MALOON — 2,556,284
CABLE OPERATED HAULING SCOOP
Filed Aug. 14, 1944 — 4 Sheets-Sheet 1

Inventor
Earl B. Maloon
By Lyon & Lyon
Attorneys

June 12, 1951  E. B. MALOON  2,556,284
CABLE OPERATED HAULING SCOOP
Filed Aug. 14, 1944  4 Sheets-Sheet 2
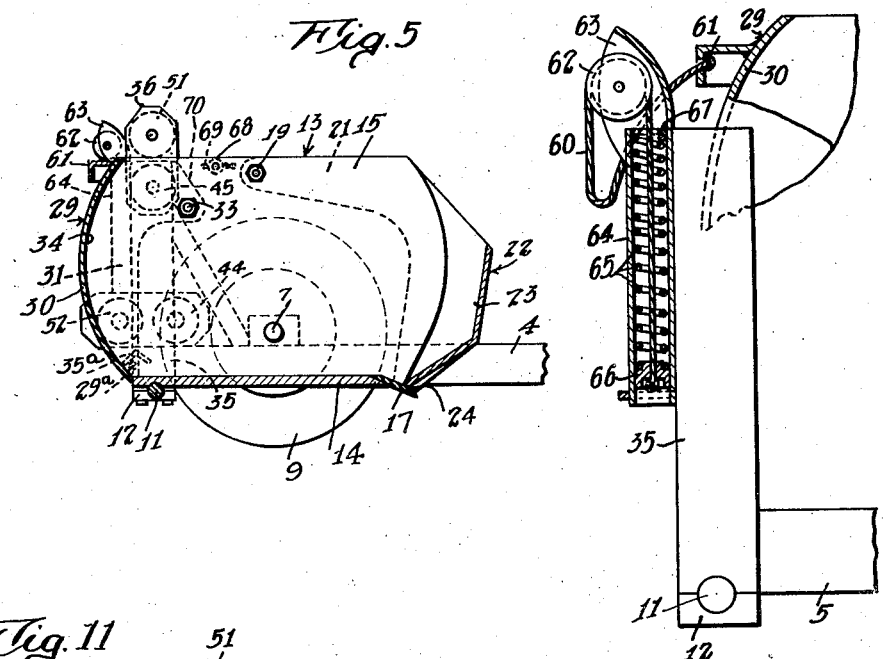
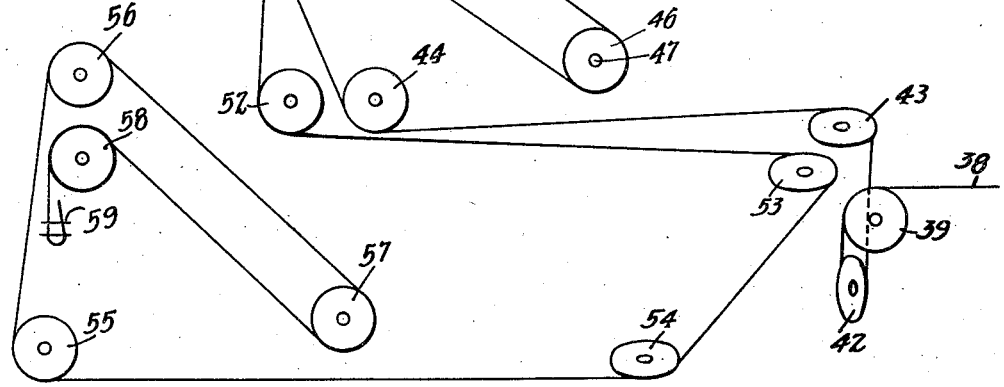
Inventor
Earl B. Maloon
By Lyon & Lyon
Attorneys

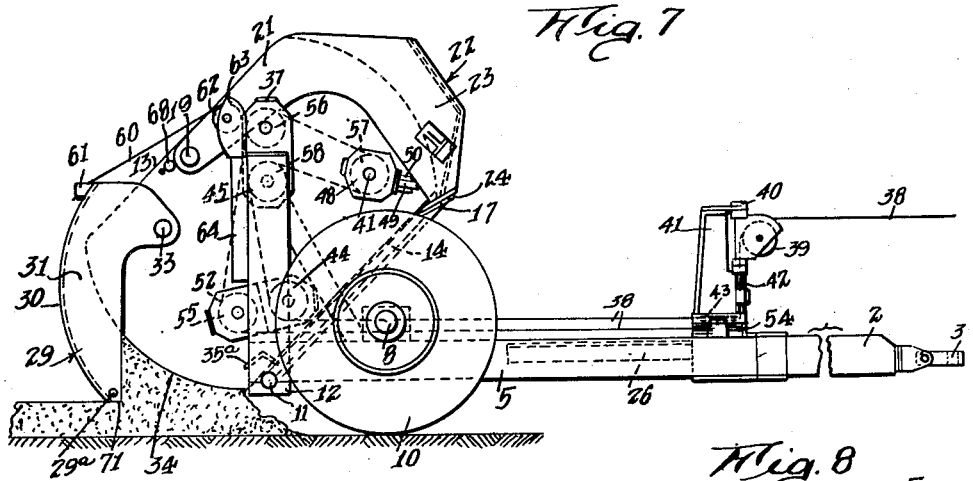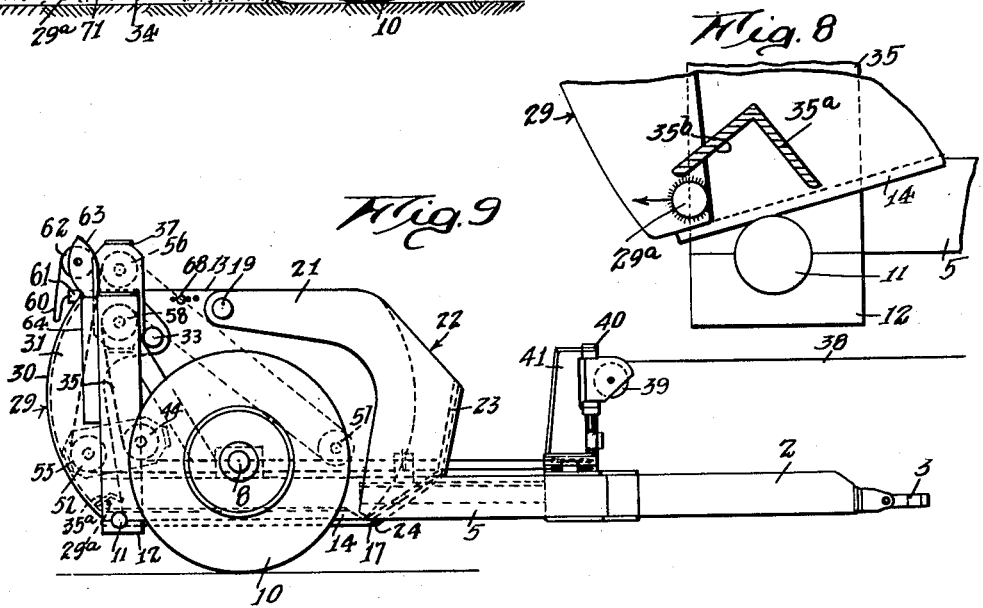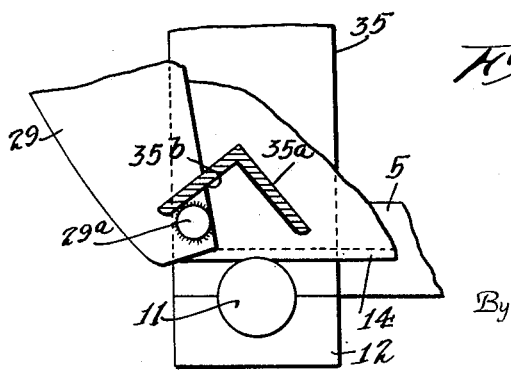

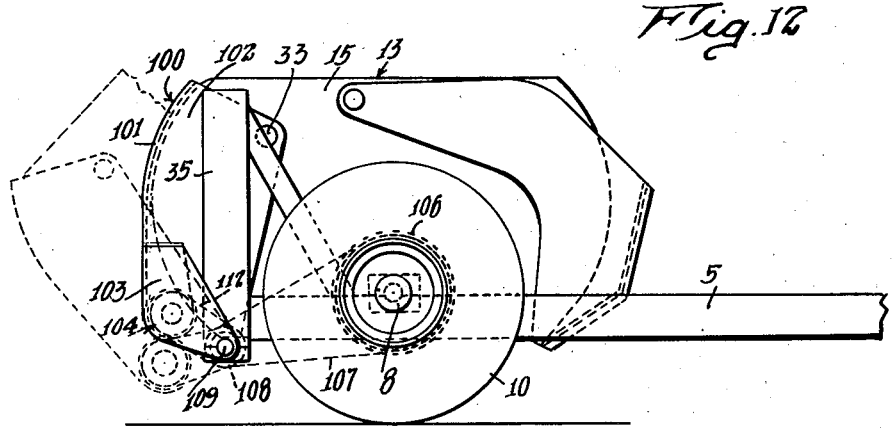
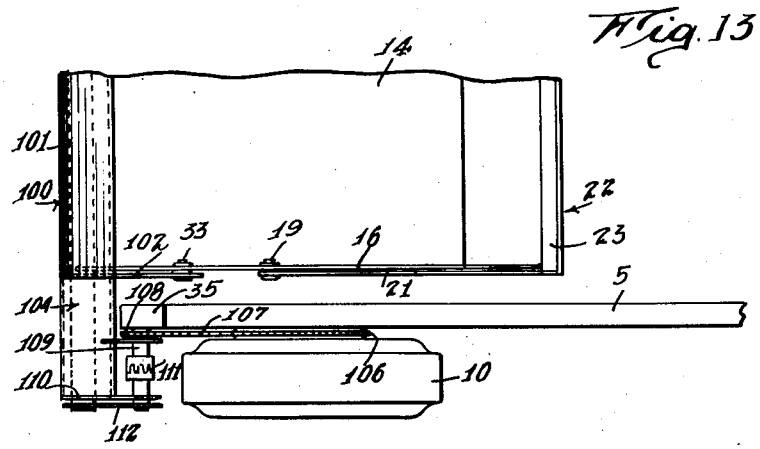
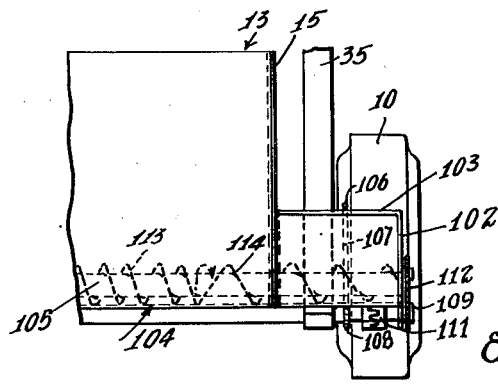

Patented June 12, 1951

2,556,284

UNITED STATES PATENT OFFICE 2,556,284

CABLE OPERATED HAULING SCOOP

Earl B. Maloon, Arcadia, Calif.

Application August 14, 1944, Serial No. 549,372

12 Claims. (Cl. 37—133)

1

This invention relates to cable operated hauling scoops and more particularly to a hauling scoop adapted to pick up, transport and spread dirt. The problem of picking up, hauling and properly distributing or spreading dirt is one which has received a great deal of attention.

In these operations, particularly where it is desirous to move the dirt for distances, it has been found that it is desirable to raise the dirt and to transport the same on wheels over the distance desired and then to discharge the dirt. In many instances removal of dirt from one location to another is necessary or desirable to spread the dirt evenly and to definite depths at the new location.

It is therefore the principal object of this invention to provide a hauling scoop or scraper in which means are provided for controlling the discharge of the dirt from the scoop or scraper so that the dirt may be spread evenly and to the desired depth.

Another object of this invention is to provide a hauling scoop or scraper of the single cable operated type which includes a scraper or pick-up bowl having a front retaining gate and a rear spreading gate, both of which are operated from a single cable means and are adapted to be adjusted to the positions of pick-up and spread desired.

Another object of this invention is to provide a hauling scoop or scraping device of the single cable operated type including a bowl, front and rear aprons which are cable operated, and in which the rear gate or apron may be actuated by a cable and spring means to determine the depth of the spreading of the dirt on discharge from the scraper, both by the positioning of the said tail gate or apron and by the position to which the said bowl is elevated or angled with reference to the surface over which the said scoop or scraper is traveling.

Another object of this invention is to provide a hauling scoop or scraper which includes a bowl, a front apron or gate and a rear apron or gate, all of which are adapted to be operated by a single cable and in which the rear gate or apron is supported to swing to closed position for retaining the load within the bowl.

Another object of this invention is to provide means for maintaining the rear apron in a closed position during operations of picking up and transporting the load and which means are preferably automatically operable upon actuation of the bowl to dumping or spreading positions, permitting the rear gate to open.

2

Another object of this invention is to provide a hauling scoop or scraper which includes means for distributing the material picked up within the scoop over a relatively large area to the rear of the scoop.

Other objects and advantages of this invention it is believed will be apparent from the following detailed description of two embodiments thereof as illustrated in the accompanying drawings.

In the drawings:

Figure 5 is a sectional edge elevation taken substantially on line 5—5 of Figure 1.

Figure 6 is a fragmental sectional elevation of the tail gate or apron control means embodying my invention.

Figure 7 is a side elevation of the hauling scoop or scraper embodying my invention illustrating the same in spreading position.

Figure 8 is a fragmental view illustrating the release of the tail gate or apron from the locking means upon tilting of the scoop or bowl.

Figure 9 is a side elevation illustrating the structure in transporting position.

Figure 10 illustrates the locking means in hauling position.

Figure 11 is a diagram of the cable reeving incorporated in the hauling scoop or scraper embodying my invention.

Figure 12 is a side elevation of a hauling scoop having a modified form of tail gate.

Figure 13 is a fragmental plan view of the structure of Figure 12.

Figure 14 is a rear elevation of the structure of Figure 13.

Figure 1:
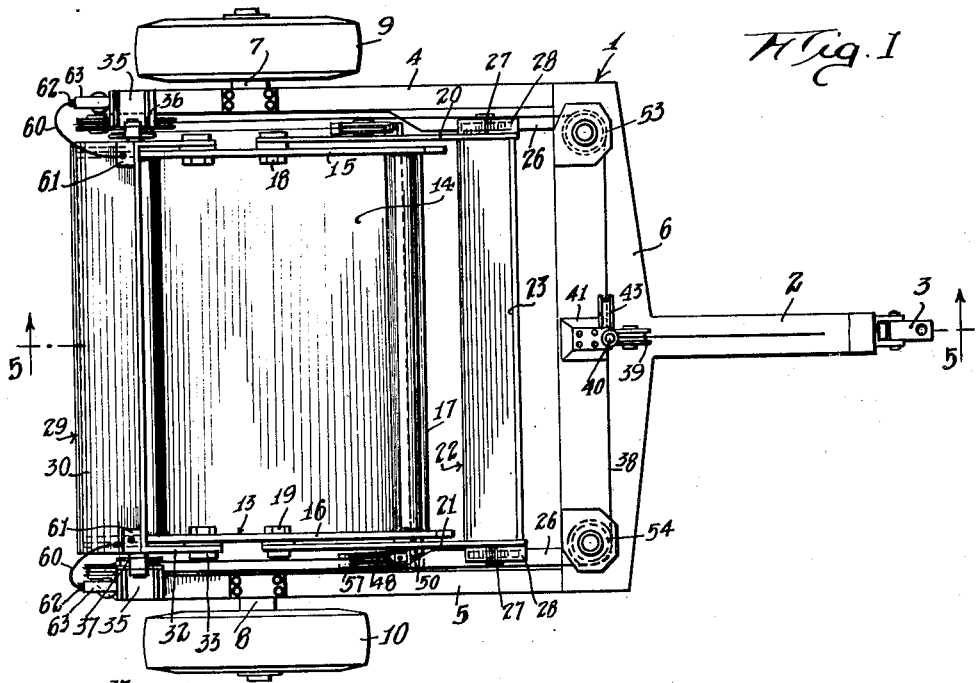
Figure 1 is a plan view of a hauling scoop or scraper embodying my invention.

In the preferred embodiment of my invention illustrated in the accompanying drawings, 1 indicates a frame having at its forward end a hitch bar 2 by means of which it may be suitably attached through such medium as the clevis 3 with the draw bar of a tractor or other vehicle. The frame 1 includes parallel side bars 4 and 5 and a front frame structure 6 connecting the bars 4 and 5 with the hitch bar 2.

Carried upon the opposite frame bars 4 and 5 are stub axles 7 and 8 upon which ground wheels 9 and 10 are suitably journaled. Positioned between the side bars 4 and 5 at their rear is a bowl supporting axle 11 which is journaled in suitable bars 12 supported from the under face of the said bars 4 and 5. Secured to the axle 11 is a bowl 13.

The bowl 13 includes a bottom plate 14 and spaced side plates 15 and 16. Secured to the forward end of the bottom plate 14 is a cutting edge 17 which provides the scraper blade for picking up the dirt or other material desired to be transported or moved. Secured to the two side plates 15 and 16 at suitable pivots 18 and 19 are the side arms 20 and 21 of the front gate or apron 22. The front gate has extending between the arms 20 and 21 an angled apron plate 23 which, as the same is viewed in Figure 5, is adapted to engage the scraper blade 17 immediately adjacent the forward edges 24 of the side plates 15 and 16 and to thus retain the dirt or load within the bowl when the bowl is rotated around the axle 11 to the said transporting position shown in Figure 5.

Figure 2:
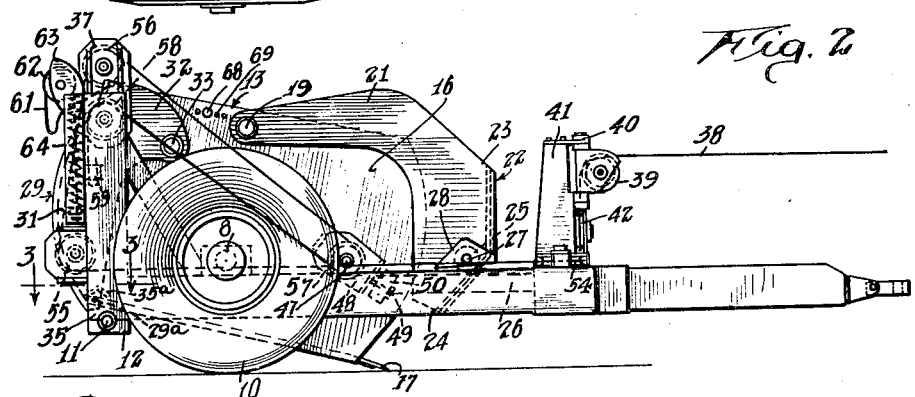
Figure 2 is a side elevation thereof.
Figure 3:
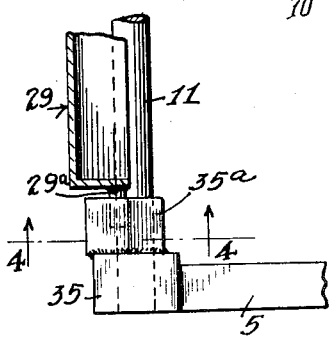
Figure 3 is a plan section of the automatic locking means taken on line 3—3 of Figure 2.
Figure 4:
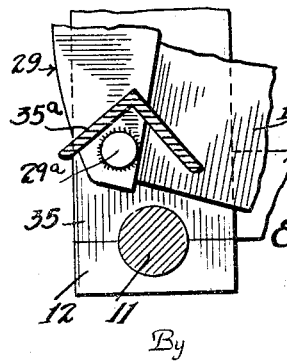
Figure 4 is a vertical section on line 4—4 of Figure 3.

The pivots 18 and 19 of the front gate or apron 22 it will be noted are positioned at the upper edges of the plates 15 and 16 and in position above the ground wheels 9 and 10 and are situated toward the rear of the plates 15 and 16 so that the force of gravity acts at all times to rotate the front gate 23 in a clock-wise direction as indicated in Figure 2, that is, to the position to close the front of the bowl 13.

Means are provided for retaining the front gate 23 elevated from the scraping blade 17 when the scraping blade 17 is lowered to the scraping position as indicated in Figure 2, which means may be of the following construction:

Mounted upon each of the side arms 20 and 21 are rollers 25 which are adapted to engage and roll along track plates 26 which are secured to or are formed as an extension of the frame sides 4 and 5. The rollers 25 are suitably journaled on supporting stubs 27 and are shrouded within guards 28 to prevent their becoming fouled by dirt or other foreign matter.

The tail gate or apron 29 is composed of a curved tail apron 30 secured between side plates 31 at its opposite ends and which side plates 31 provide forwardly extending arms 32 which are journaled upon stub axles 33 secured to the side plates 15 and 16 in position in advance from the rear of the bowl 13 and in position toward the upper edges of the said plates 15 and 16. This pivoting of the tail gate 29 permits gravity to rotate the tail gate or apron 30 to a closed position to engage with the rear curved edges 34 of the side plates 15 and 16 and with the side plates 31 extending over and in close contact with the side plates 15 and 16 of the bowl 13 to retain the dirt within the bowl. Means are provided for actuating the bowl 13 and the tail gate 29, which means are preferably of the following construction:

Mounted at the rear of the frame bars 4 and 5 are standards 35. These standards provide supports for the cable pulleys 36 and 37 over which the operating cable 38 is trained.

The operating cable 38 is adapted to be actuated by any suitable means (not shown) commonly employed in this art and as is usually mounted upon the tractor or other hauling medium. This means usually includes a drum upon which the said cable 38 is wound and which is driven by the power take-off from the tractor or other transporting vehicle. The cable 38 is trained over a pulley 39 which is mounted to swivel in the bracket 40 carried by the front standard 41 positioned upon the front frame member 6. Also supported by this bracket is a pulley 42 over which the cable 38 is trained after passing over the pulley 39 and the cable 38 after leaving the pulleys 42 is trained over an upper pulley 43 carried upon the frame elements 6 at one side of the frame 1. The cable after passing over the pulley 43 is trained over a rear pulley 44 supported at the base of the standard 35 on the corresponding side of the frame 1. The cable 38 is then reeved over the upper pulley 45 supported by the same standard 35 and then passes over the hoisting pulley 46. The hoisting pulley 46 is journaled upon a pin 47 within the bracket 48. The bracket 48 has a supporting stud 49 which is journaled in a supporting plate 50 secured to the side plate 16 of the bowl 13.

After leaving the hoisting pulley 46, the cable 38 is reeved over the upper return pulley 51, then over a bottom return pulley 52 carried by the standard 35 and is then reeved over frame pulleys 53 and 54 carried upon the frame element 6 to the opposite side of the frame 1. The cable is then trained over a lower pulley 55 mounted at the base of the standard 35 on this side of the frame and passes over the upper pulley 56 of the said standard 35 and is reeved over a second hoisting pulley 57 which is carried by the side plate 15 of the bowl 13 in precisely the same manner as the hoisting pulley 46 is supported upon the side plate 16 of the bowl 13. After passing over the pulley 57 the cable is trained over the anchor pulley 58 carried upon this standard 35 and its free end anchored to the said standard 35 as indicated at 59.

Means are provided for controlling the actuation of the tail gate 29 in addition to the control provided through the tilting of the bowl 13 through the operation of the cable, which means preferably include flexible connecting elements such as cables 60 which are suitably fixed to the upper edge of the tail gate apron 30 as indicated at 61. The opposite ends of these flexible connecting elements 60 pass over guide pulleys 62 carried in a bracket 63 secured to the upper end of a cylindrical spring housing 64 secured to the standards 35. The said flexible connecting elements are secured to springs 65 which are housed within the cylinder 64 and are retained at their lower ends by means of pins in the base of the cylinders. This structure is duplicated at both sides of the tail gate so as to provide for uniformity of movement of the tail gate around its supporting pivots 33.

As illustrated in Figure 6, the spring 65 may be positioned within the cylinder 64 between the plunger head 66 and an upper stop ring 67. This permits the use of a compression type of spring by extending the flexible connecting elements 60 through the cylinder 64 and passing the same through the plunger head 66 and securing the same on the under surface thereof. Means are provided for adjusting the opening of the tail gate and which means provide limit stops. These means as herein illustrated include the abutment elements 68 which are adapted to be mounted in any one of a plurality of holes 69 formed along the upper edge of the side plates 15 and 16 of the scraper bowl 13 in position to engage the upper edges 70 of the side plates 31 of the tail gate or apron 29. By positioning these stop members in the different holes provided, an adjustment of the limit to which the tail gate may open is provided, thereby determining the depth at which the dirt will be spread on the opening of the tail gate or apron 29 as it is illustrated in Figure 5.

The flexible connections 60 perform the function of swinging the tail gate or apron 29 to the open position when the bowl is raised beyond the limits as determined by the length of cable between their point of connection at 61 of the rear gate and their guide pulleys 62. By adjusting this length of cable as may be done by releasing the connection at 61, the point at which the tail gate will swing to open position may be determined.

The springs 65 perform a holding connection between the tail gate 29 and the standards 35 so that the gate will open under the influence of the load within the bowl 13 as the bowl is elevated and as the said connection causes the tail gate 29 to rotate around its supporting pivots in a clock-wise direction as viewed in Figure 5.

The hauling scoop or scraper embodying my invention has the following mode of operation:

The scraper is transported to its place of use in the position as indicated in Figure 9, that is, with the bowl 13 raised so as to permit its travel freely upon the ground wheels 9 and 10. At the point of desired use, the cable 38 is unwound from the drum or reel (not shown) which permits the bowl to drop to the position where the scraping blade 17 is engaged with the surface. As the scraper continues to move forward, the dirt is picked up in the bowl 13. When the desired quantity of dirt or other material is within the bowl, the cable 38 is rewound upon the reel to pivot the bowl 13 on the bowl supporting axle 11, raising the scraping blade 17 in position where it engages under the lower edge of the front gate or apron 23, that is, to the position indicated in Figure 5 wherein the apron 23, together with the tail gate 29, acts to retain the load within the bowl 13 as the bowl is being moved to the place where it is desired to release or spread the dirt.

At this position the cable 38 is wound further upon the reel or drum causing the bowl 13 to pivot in a counter-clockwise direction on the supporting axle 11. The degree to which the bowl 13 is thus raised or pivoted determines the rate at which the dirt will be discharged from the rear of the bowl as the rear apron 29 swings to an open position under the influence of the dirt within the bowl 13 and as determined by the flexible connection 60.

The stops 68 and their adjustment determine the ultimate opening of the tail gate 29 and this, together with the degree of inclination of the bottom 14 of the bowl 13, determines the depth to which the dirt is spread at the desired location.

As the tail gate 29 is pivoted upon its supporting trunnions 33 at the rear of the bowl 13, it is apparent that the further the rotation of the bowl upon its axle 11 in its supporting bearings 12 in a counter-clockwise direction, the closer the spread edge 71 of the tail gate 29 will be brought to the surface upon which the ground wheels 10 are riding, and by this means the depth of spreading of the soil upon the surface is determined between the minimum inclination of the bottom 14 at which the dirt will freely slide from the bowl 13 and the maximum counter-clockwise rotation of the bowl upon its supporting axle 11, the maximum inclination being of course determined by the lifting pulleys 46 and 57 being brought up to and in engagement with the upper pulleys 56 and 51, respectively.

When the cable 38 is unreeved from its reel or drum, the bowl 13, by gravity and the additional pull of springs 65 acting through the flexible connecting elements 60, returns to loading position shown in Figure 2, the front apron is stopped from rotation around its supporting trunnions 18 and 19 by the supporting rollers 28 connecting the track plates 26 carried by the frame 1. During this operation of course the gate 23 has a forward movement along the tracks 26 as the scraping blade 17 is lowered into engaging position.

It will be apparent from the foregoing that the only adjustments necessary for the proper operation of the hauling scoop or scraper embodying my invention is of the positions of the spreading stops 68 and of the flexible connecting elements 60. The connecting elements 60 are disconnected at 61 from the tail gate 29. The stops 68 are then set in the proper holes 69 to permit the rear gate 29 to open to proper spreading depth when the bowl is raised to its maximum dumping angle. After setting the spreading stops in their stopping position, the bowl 13 is returned to the hauling position of Figure 9 and the connecting elements 60 are re-attached at 61 to the upper edges of the tail gate 29 leaving the amount of slack that is required to open the gate to the spreading position at the said dumping angle of the bowl 13.

Means are preferably provided for maintaining the rear apron or tail gate 29 in closed position during the operations of picking up the material in the bowl 13 and during the transporting of the said material in the bowl 13 to the position where it is desired to spread and discharge the material, which means may be of the following construction and operation:

Secured to each standard 35 near the base thereof is an angled holding or locking plate 35ᵃ which is adapted to cooperate with locking or holding pins 29ᵃ secured to the end sections of the tail gate 29. It will be observed that the operation of picking up the load and transporting the load as shown in Figures 2, 5, and 9 of the locking or holding pins 29ᵃ are engaged within the angled plates 35ᵃ whereby the tail gate 29 is maintained in closed position. When the bowl 13 is elevated to discharge or spread the load, the operation of tilting the bowl 13 or rocking the bowl 13 around its supporting axle 11 results in the changing of the angular relationship of the locked plates 35ᵃ with reference to the locking pins 29ᵃ, permitting as viewed in Figure 8 the locking pins 29ᵃ to pass out from under the locking plates 35ᵃ, thereby permitting the tail gate 29 to open. The different positions of the axis around which the bowl 13 turns in tending the discharge or spreading position and the positions of the trunnions 33 upon which the tail gate 29 is pivotally supported permits this effective change in angular relationship of the loading plates 35ᵃ with reference to the tail gate 29. It will be observed that as the tail gate 29 is supported at pivots 33 near the upper portion of the side plates 15 and 16 of the bowl 13, the operation of tilting the bowl around the axle 11 is to move the pivots 33 rearwardly with respect to the locking plate 35ᵃ while at the same time lowering the retaining pins 29ᵃ permitting the same to pass under the locking plate 35ᵃ. When the bowl 13 is not tilted to the discharge or spreading position, any attempt of the tail gate 29 to rotate upon its supporting trunnions 33 results in the retaining pins 29ᵃ engaging the inclined plate section 35^b of the retaining plates 35^a.

In Figures 12, 13, and 14, I have illustrated a modified form of tail gate which is of substantially the same construction and mode of operation as that illustrated in Figures 1 to 10, inclusive, with the exception that in this tail gate I provide a means for spreading the load of the bowl 13 over an extended area. This modified form of tail gate 100 may replace the tail gate 29 upon the supporting trunnions 33. The modified form of tail gate 100 includes a rear plate 101 and side plates 102 which are extended on opposite sides of the bowl 13 by the positioning of extended boxes 103 and secured to the respective side plates of 102. At the bottom of the gate 100, there is provided a distributing screw 104 which is mounted in the open throat 105 of the gate 100. This screw 104 extends out through the end boxes 103 at the respective sides of the bowl 13 and means are provided for driving this screw. As herein illustrated, these means include a sprocket 106 which is secured to one of the ground wheels 10 to be driven thereby. A chain 107 is trained over this sprocket and passes over a sprocket 108 mounted on a counter-shaft 109. The counter-shaft 109 is journaled in an extension of the standard 35 on one side of the scoop and is journaled in an end plate 110 which forms the end plate of the box 103 at this same side of the frame. The shaft 109 is a divided shaft, the sections of which are adapted to be coupled together by means of a clutch diagrammatically illustrated at 111.

A sprocket and chain connection 112 connects the shaft 109 with the screw 104. In order to obtain equal distribution of the material within the bowl 11 through the throat 105 by the screw 104, the screw 104 has two short lead flights 113 as its central section and two long lead flights 114 at the outer ends of the screw 104.

Figure 14 illustrates only one-half section of the screw 104 and the same is duplicated upon the opposite side of the bowl 13. In operation the gate 100 is supported upon trunnions 33, but on tilting of the bowl 13 does not swing to an open position as does the tail gate 29. The material within the bowl travels over the bowl bottom 14 into the throat 105 and is discharged through the throat 105 through the medium of the screw 104 and is thereby distributed substantially evenly over the extended surface at the rear of the bowl 13. This tail gate 100 is particularly usable for the purpose of picking up and distributing the stock piles of road surface materials which are often maintained along highways for the purpose of repairing the highway surfaces. It will be apparent, however, that the use of this tail gate is not limited to this particular spreading operation.

Having fully described my invention, it is to be understood that I do not wish to be limited to the details herein set forth, but my invention is of the full scope of the appended claims.

I claim:

1. In a device of the character described, a frame, a bowl pivotally supported in the frame on an axle connected to the bowl near its lower rear portion, means for rotating the bowl around the axle to elevate the forward end of the bowl, a front apron pivotally secured to the bowl and adapted to cooperate with the bowl upon elevation of the front end of the bowl to retain material within the bowl, a rear apron pivotally supported to the bowl, means connected to the rear apron adjacent the upper end thereof and to the frame for rotating the rear apron to open position upon elevation of the front end of the bowl, and stop means carried by the bowl for limiting opening movement of the rear apron upon its pivots.

2. In a device of the character described, a frame, a bowl carried by the frame and having a scraping edge, said bowl being supported within the frame by means of an axle journaled at the rear of the frame and said axle being carried by the bowl at its lower rear portion, a tail gate pivotally supported by the bowl and acting to retain material within the bowl, said tail gate comprising an apron and a pair of end plates secured to the apron, said end plates providing forwardly extending arms upon which the tail gate is pivotally supported from the bowl whereby the tail gate is free to pivot under the influence of gravity at its bottom portion toward the bowl, means for elevating the front end of the bowl, means connected to the tail gate adjacent its upper end and with the frame for rotating the tail gate around its pivotal supports to spreading position upon elevation of the forward end of the bowl, and adjustable means on the bowl to engage the rear tail gate to limit the movement thereof and thereby determine the depth to which the material is spread on discharge from the bowl.

3. In a device of the character described, a frame, a bowl carried by the frame and having a scraping edge, said bowl being supported within the frame by means of an axle journaled at the rear of the frame and said axle being carried by the bowl at its lower rear portion, a tail gate pivotally supported by the bowl and acting to retain material within the bowl, said tail gate comprising an apron and a pair of end plates secured to the apron, said end plates providing forwardly extending arms upon which the tail gate is pivotally supported from the bowl whereby the tail gate is free to pivot under the influence of gravity at its bottom portion toward the bowl, means for elevating the front end of the bowl, means connected with the tail gate for rotating the tail gate around its pivotal supports to spreading position upon elevation of the forward end of the bowl, and limit stops carried by the bowl to limit the opening of the tail gate with reference to the bowl.

4. In a device of the character described, a frame, a bowl supported pivotally at its rear to the rear of the frame, ground wheels carried by the frame, a front apron pivoted to the bowl, a rear apron pivoted to the bowl, single cable operating means for rotating the bowl around its pivotal connections with the frame to elevate the forward end of the bowl, rear apron control elements connected to the rear apron adjacent its upper end and to the frame, whereby the rear apron is opened upon elevation of the forward end of the bowl, and holding means interposed between the rear apron and the frame for maintaining the rear apron from rotation on its pivot until the bowl is elevated at its forward end.

5. In a device of the character described, a frame, a scraper bowl pivoted at its rear to the rear of the frame, ground wheels carried by the frame, a front apron pivoted to the bowl, a rear apron pivoted to the bowl, single cable operating means for rotating the bowl around its pivotal connections with the frame to elevate the forward end of the bowl, rear apron control elements connected between the rear apron and the frame, whereby the rear apron is opened upon elevation of the forward end of the bowl, and holding means interposed between the rear apron and the frame for maintaining the rear apron from rotation on its pivot until the bowl is elevated at its forward end.

6. In a device of the character described, a frame, a bowl pivotally supported at its bottom to the rear of the frame, ground wheels carried by the frame forwardly from the position of pivotal attachment of the bowl with the frame, a rear apron pivotally connected to the bowl at a point to the rear of the ground wheels and at a point near the upper end of the bowl whereby the bowl on pivoting around its axis will act to pivot the rear apron to open position permitting discharge of the bowl contents from the rear of the bowl as the device is moved forwardly, latch means secured to the frame and latch pins secured to the lower end of the rear apron and adapted to engage the latch means to hold the rear apron in closed position when the bowl is in load accumulating and carrying positions with respect to the frame, said latch pins being adapted to pass from under the latch means when the bowl is rotated upon its pivotal connection with the frame to load discharging position whereby the rear apron opens.

7. In a device of the character described, a frame, a bowl pivotally supported at its bottom to the rear of the frame, ground wheels carried by the frame forwardly from the position of pivotal attachment of the bowl with the frame, a rear apron pivotally connected to the bowl at a point to the rear of the ground wheels and at a point near the upper end of the bowl whereby the bowl on pivoting around its axis will act to pivot the rear apron to open position permitting discharge of the bowl contents from the rear of the bowl as the device is moved forwardly, latch means secured to the frame and latch pins secured to the lower end of the rear apron and adapted to engage the latch means to hold the rear apron in closed position when the bowl is in load accumulating and carrying positions with respect to the frame, said latch pins being adapted to pass from under the latch means when the bowl is rotated upon its pivotal connection with the frame to load discharging position whereby the rear apron opens, and means connected between the upper end of the rear apron and the frame for causing the rear apron to swing around its pivotal support upon rotation of the bowl to load discharging position.

8. In a device of the character described, a frame, a bowl pivotally supported at its bottom to the rear of the frame, ground wheels carried by the frame forwardly from the position of pivotal attachment of the bowl with the frame, a rear apron pivotally connected to the bowl at a point to the rear of the ground wheels and at a point near the upper end of the bowl whereby the bowl on pivoting around its axis will act to pivot the rear apron to open position permitting discharge of the bowl contents from the rear of the bowl as the device is moved forwardly, latch means secured to the frame and latch pins secured to the lower end of the rear apron and adapted to engage the latch means to hold the rear apron in closed position when the bowl is in load accumulating and carrying positions with respect to the frame, said latch pins being adapted to pass from under the latch means when the bowl is rotated upon its pivotal connection with the frame to load discharging position whereby the rear apron opens, means connected between the upper end of the rear apron and the frame for causing the rear apron to swing around its pivotal support upon rotation of the bowl to load discharging position, and stop means carried by the bowl adapted to be engaged by the rear apron to limit the pivoting of the rear apron to determine the spreading position thereof.

9. In a device of the class described, the combination of a frame, a bowl on the frame adapted to be pivoted from load accumulating position to load carrying position and to load discharging position, the bowl having an open rear end, a rear apron closing the rear end of the bowl to load accumulating and load carrying positions, the rear apron being pivotally secured to the bowl at the position near the upper edges of the bowl, latch pins carried by the rear apron to engage latch means secured to the frame whereby the latch pins will pass from under the latch means permitting the rear apron to swing to open position when the bowl is moved from carrying to discharging positions.

10. In a device of the character described, the combination of a frame, ground wheels supporting the frame, a bowl pivotally secured to the frame at its rear end, a rear apron closing the rear end of the bowl, the rear apron being pivotally supported by the bowl at a point forwardly of the rear of the bowl and near the upper edge of the bowl, stop means carried by the bowl to engage the rear apron to determine the degree of pivoting of the rear apron with relation to the bowl, a flexible connection secured to the frame and including a yieldable extensible means connected with the rear apron for causing the rear apron to pivot to open position when the bowl is rotated upon its pivotal support to raise the forward end of the bowl to load discharging position.

11. In a device of the character described, the combination of a frame, ground wheels supporting the frame, a bowl pivotally secured to the frame at its rear end, a rear apron closing the rear end of the bowl, the rear apron being pivotally supported by the bowl at a point forwardly of the rear of the bowl and near the upper edge of the bowl, stop means carried by the bowl to engage the rear apron to determine the degree of pivoting of the rear apron with relation to the bowl, a flexible connection secured to the frame and including a yieldable extensible means connected with the rear apron for causing the rear apron to pivot to open position when the bowl is rotated upon its pivotal support to raise the forward end of the bowl to load discharging position, and the stop means carried by the bowl being in adjustable position thereon to determine the degree of opening of the rear apron with respect to the bowl whereby the lower edge of the rear apron may act to determine the depth to which the load of the bowl is spread to the rear of the bowl as the bowl is moved forwardly.

12. In a device of the character described, the combination of a frame, a bowl pivoted at its bottom rear to the rear of the frame and a single cable means for rotating the bowl around its pivotal connection with the frame, said single cable means including a directional pulley pivotally supported upon a standard upon the frame in advance of the bowl, a directional pulley secured to the frame at one side thereof, a standard secured to the said side of the frame immediately above the point of pivoting of the bowl with the frame, a directional pulley secured to the frame adjacent the standard, a directional pulley secured to the standard above the latter said directional pulley, a pulley pivotally supported by the bowl in position in advance of the latter said pulleys, a return pulley carried by the standard near the upper end thereof, a return pulley secured to the standard near the base thereof, a pair of directional pulleys secured to the frame in advance of the bowl and at the opposite sides thereof, a standard secured to the opposite side of the frame and extending upwardly from the pivotal support of the bowl with the frame, a directional base pulley carried by the standard, a second directional pulley secured near the upper end of the latter said standard, a second pulley pivotally carried by the bowl in advance of the second stated standard, a dead end pulley secured to the second standard, means for anchoring the single cable which is reeved over the pulleys in the succession named, a rear apron pivotally mounted on the bowl, and means secured to the standards for moving the apron about its pivotal mounting when the bowl is rotated by tensioning the said single cable.

EARL B. MALOON.

REFERENCES CITED

The following references are of record in the file of this patent:

UNITED STATES PATENTS

| Number | Name | Date |
| --- | --- | --- |
| Re. 21,170 | Paulsen | Aug. 1, 1939 |
| 701,778 | Waddell | June 3, 1902 |
| 1,811,030 | Shaw | June 23, 1931 |
| 2,083,307 | Schultz | June 8, 1937 |
| 2,157,311 | Walch | May 9, 1939 |
| 2,190,969 | Adams | Feb. 20, 1940 |
| 2,404,482 | French | July 23, 1946 |